Figures 1, 2:
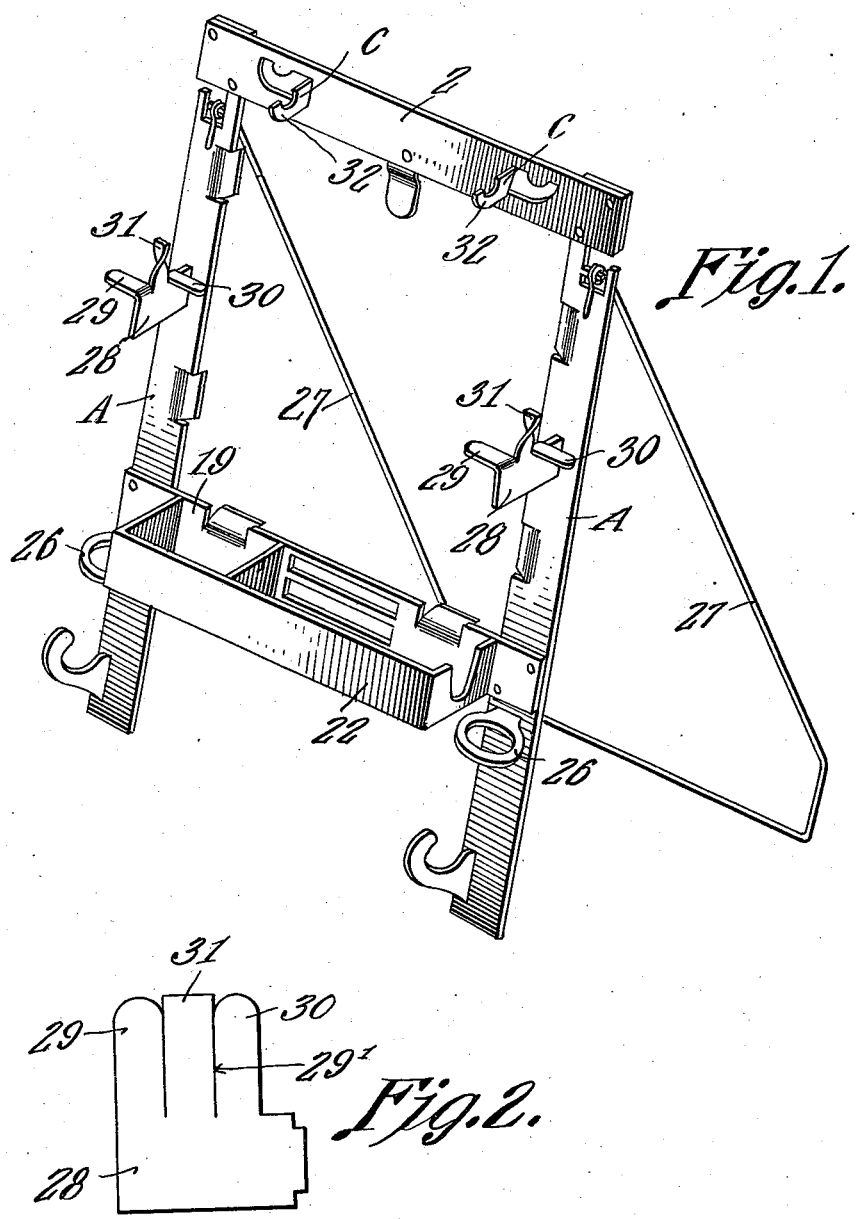

A. P. S. DEEM.
SPOOL HOLDER.
APPLICATION FILED JAN. 31, 1911.

1,012,822.

Patented Dec. 26, 1911.

Addison P. S. Deem,
Inventor

Witnesses by C. A. Snow & Co.
Attorneys

UNITED STATES PATENT OFFICE.

ADDISON P. S. DEEM, OF BELPRE, OHIO.

SPOOL-HOLDER.

1,012,822. Specification of Letters Patent. Patented Dec. 26, 1911.

Original application filed August 1, 1910, Serial No. 574,882. Divided and this application filed January 31, 1911. Serial No. 605,717.

*To all whom it may concern:*

Be it known that I, ADDISON P. S. DEEM, a citizen of the United States, residing at Belpre, in the county of Washington and State of Ohio, have invented a new and useful Spool-Holder, of which the following is a specification.

This invention relates to display racks and is more particularly a division of an application filed by me on August 1, 1910, said application bearing Serial No. 574,882.

One of the objects of the invention is to provide, in combination with a rack, a simple form of spool holder whereby a spool of thread can be properly supported in such a manner as to easily rotate, said spool holder being simple in construction, durable and attractive.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings: Figure 1 is a perspective view of a display rack having the spool holder thereon. Fig. 2 is a detail view of a blank from which the spool holder is formed.

Referring to the figures by characters of reference A designates a frame having a brace 27 pivotally connected thereto, this brace and its connections, however, constituting no part of the present invention but forming the subject matter of a separate application. The frame A has upper and lower cross bars 2 and 19 respectively, the strip 19 supporting a receptacle 22 in which used and unused spools may be placed. Prongs 32 are punched out of the material of which the top bar 2 is formed and extend forwardly from the bar.

The prongs have a rounded receiving face to engage and retain pens and pencils and the like, and each of them is provided with a sharp depression or cutting edge $c$ which is for the purpose of cutting thread, the thread being led thereto from the spool holders 28. Each of these spool holders consists of a single piece of metal having outwardly extending arms 29 and 30 which project in opposite directions and a stud 31 which is spirally twisted to allow of the free rotation of a spool placed thereon. The arms 29 and 30 form a base to support the spool and permit rotation thereof.

Each spool holder is preferably formed in a single piece of metal, such as shown in Fig. 2, said metal piece having parallel incisions cut therein, as indicated at 29' and whereby the arms 29 and 30 and the stud 31 are produced, the arms 29 and 30 being bent at right angles to the metal piece so as to form supports for a spool while the stud 31 is twisted as shown in Fig. 1.

Thimble holders such as shown at 26, and other articles found useful in connection with a structure such as has been described, may be mounted on the rack.

What is claimed is:—

1. In a device of the class described a frame, and a spool holder carried by the frame and consisting of a plate having substantially vertical faces, laterally spaced oppositely extending supporting arms at the upper edge of the plate, and an intermediate upwardly extending stud upon the upper edge of the plate and adapted to extend into the bore of a spool, said stud being twisted throughout its length.

2. In a device of the class described a supporting structure, a substantially vertical plate outstanding therefrom, laterally spaced oppositely extending arms integral with the upper edge portion of the plate, an upstanding stud extending from the upper edge of the plate and between the arms, said stud constituting spool engaging means and being twisted throughout its length to present spiral bearing edges, and a notched thread cutter outstanding from the supporting structure and above the spool holder.

3. The combination with a support, of a spool holder formed from a single blank having parallel incisions extending thereinto from one edge to form arms and a stud between the arms, said holder including a plate, arms extending in opposite directions from one edge of the plate, and a stud between and perpendicular to the arms and extending from the plate, said stud being twisted throughout its length to form spiral bearing edges.

In testimony that I claim the foregoing as my own, I have hereto affixed my signature in the presence of two witnesses.

ADDISON P. S. DEEM.

Witnesses:
DONES M. ALDERMAN,
ELMER L. BROWN.

Copies of this patent may be obtained for five cents each, by addressing the "Commissioner of Patents, Washington, D. C."